United States Patent
Crovella et al.

[15] 3,672,353
[45] June 27, 1972

[54] ECTOPIC HEARTBEAT DETECTOR

[72] Inventors: Edward A. Crovella, Snyder, N.Y.; C. Verne Barfield, Mableton, Ga.

[73] Assignee: Cardiac Electronics, Inc., Clarence, N.Y.

[22] Filed: Dec. 23, 1969

[21] Appl. No.: 887,661

[52] U.S. Cl. .................................................128/2.06 A
[51] Int. Cl. ...........................................................A61b 5/04
[58] Field of Search ...............128/2.06 A, 2.06 B, 2.06 F, 128/2.06 G, 2.06 R

[56] References Cited

UNITED STATES PATENTS

| | | | |
|---|---|---|---|
| 3,463,143 | 8/1969 | Karsh | 128/2.06 A |
| 3,267,933 | 8/1966 | Mills et al. | 128/2.06 A |

FOREIGN PATENTS OR APPLICATIONS

| | | | |
|---|---|---|---|
| 1,264,680 | 3/1968 | Germany | 128/2.06 F |

Primary Examiner—William E. Kamm
Attorney—Sommer, Weber & Gastel

[57] ABSTRACT

A critical ectopic beat detector for providing a warning that an ectopic beat is approaching a critical portion of a heartbeat including first circuit means for monitoring a heartbeat including means for providing a first signal representative of a normal portion of said heartbeat and a second signal representative of an ectopic beat, second circuit means for measuring the time relationship between said fist and second signals, and third circuit means for providing a third signal in the event said time reaches a predetermined value to thus provide a warning that said ectopic beat is approaching said critical portion of said heartbeat, including instrumentation for presetting said predetermined value into the circuit so that the equipment may be utilized with equal facility for different patients having different heartbeat patterns, and also including an arrangement for monitoring the heartbeat on a scope and placing on the scope an indication that the ectopic beat has approached within a predetermined time of said predetermined critical portion of the heartbeat so as to enable an accurate visual observation of the change in pattern of the heartbeat.

1 Claim, 3 Drawing Figures

TIME →

INVENTOR.
Edward Q. Crovella &
Caroll V. Barfield
BY Joseph P. Gastel
ATTORNEY.

ECTOPIC HEARTBEAT DETECTOR

The present invention relates to a cardiac monitoring apparatus, and more particularly to a device for detecting the occurrence of an ectopic heartbeat at a critical time in relationship to the remainder of the heartbeat.

By way of background a heartbeat of a normal healthy person includes the P, Q, R, S and T wave forms which are well known. However, when a person has experienced cardiac difficulty, such as various types of heart attacks, there often occurs an ectopic beat which is an additional random occurring beat. It is believed that this ectopic beat results from the irritation of the heart following damage and it occurs generally as a reaction from the normal beat. It has been found that when the ectopic beat occurs, it very often falls between the T-wave and the subsequent R-wave portion of the heartbeat. It occurs intermittently, that is, it does not occur as a part of every heartbeat waveform and when it does occur, it will generally always fall in the same location noted above. As long as it does not move from a position between the T-wave and the subsequent R-wave, it usually does no damage. However, if it should start approaching the earlier T-wave so that it falls thereon, it may initiate fibrillation, which can be fatal. It has been found, however, that if the approach of the ectopic beat toward the T-wave is detected early enough, medication can be given to the patient to desensitize the heart so that it will not keep producing ectopic beats which could lead to fibrillation when these ectopic beats reached the T-wave.

It is accordingly the primary object of the present invention to provide a critical ectopic beat detector which detects the time relationship between the critical portion of the heartbeat and any ectopic beat and provides a warning signal in the event that the ectopic beat approaches within a predetermined time interval to the T-wave.

Another object of the present invention is to provide a critical ectopic beat detector which provides a visual indication between an ectopic beat and a predetermined portion of the heartbeat waveform so as to permit visual observation for the purpose of determining whether the ectopic beat is in fact approaching the critical portion of the heartbeat. Other objects and attendant advantages of the present invention will readily be perceived hereafter.

The critical ectopic beat detector of the present invention provides a warning that an ectopic beat is approaching a critical portion of a heartbeat and comprises first circuit means for monitoring a heartbeat including means for providing a first signal representative of a normal portion of said heartbeat and a second signal representative of an ectopic beat, second circuit means for measuring the time relationship between said first and second signals, and third circuit means for providing a third signal in the event said time reaches a predetermined value to thus provide a warning that said ectopic beat is approaching said critical portion of said heartbeat. In addition, the present invention includes instrumentation for presetting said predetermined value into the circuit so that the equipment may be utilized with equal facility for different patients having different heartbeat patterns. In addition, the detector includes an arrangement for monitoring the heartbeat on a scope and placing on the scope a time indication that the ectopic beat has approached within a predetermined time of said predetermined critical portion of the heartbeat so as to enable a visual observation of the change in pattern of the heartbeat with a great degree of accuracy.

The various aspects of the present invention will be more fully understood when the following portions of the specification are read in conjunction with the accompanying drawings wherein.

It has been found that a person who has suffered cardiac difficulty, such as a heart attack, may experience ectopic heart beats, which are random occurring beats due to heart irritation. These will not necessarily occur regularly in each normal heartbeat cycle, but will occur intermittently. However, when they do occur, they usually will bear a timed relationship to the R-waves. It has been found that if such ectopic beats fall on the T-wave, which follows the R and S-waves, there is the possibility that fibrillation may occur. Generally, however, the ectopic beat normally occurs after the T-wave so that fibrillation is not started by the simultaneous occurrence of the ectopic beat and the T-wave. If the ectopic beat starts approaching the T-wave, this is usually an indication that it will continue to approach it until such time as it is superimposed on the T-wave, and when this occurs fibrillation may occur. However, if it is observed that the ectopic beat is approaching the T-wave, medication can usually be given to the patient in advance of its reaching the T-wave and thus forestall the fibrillation which could otherwise occur. The ectopic beat detector of the present invention is capable of detecting whether the ectopic beat is approaching the T-wave to permit the timely giving of medication to the patient.

Figure 3:
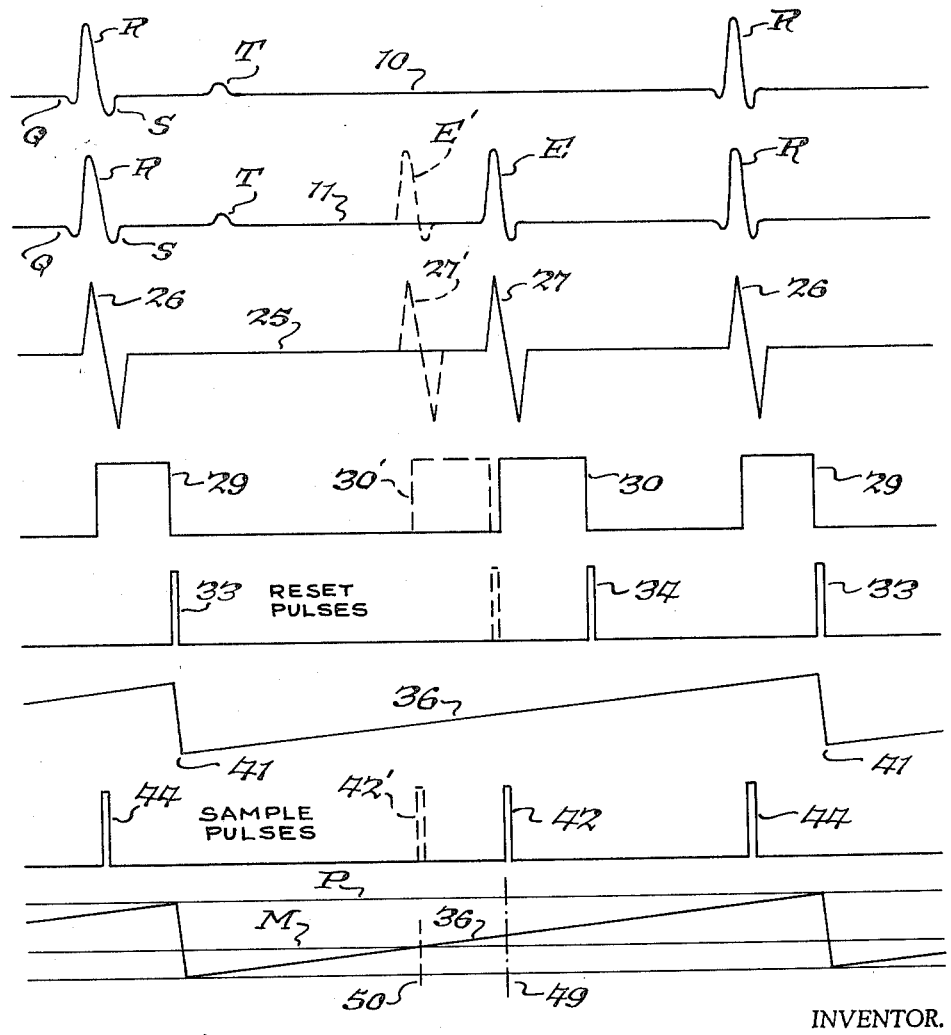
FIG. 3 is a schematic view showing the various wave forms along a time base.
Figure 2:
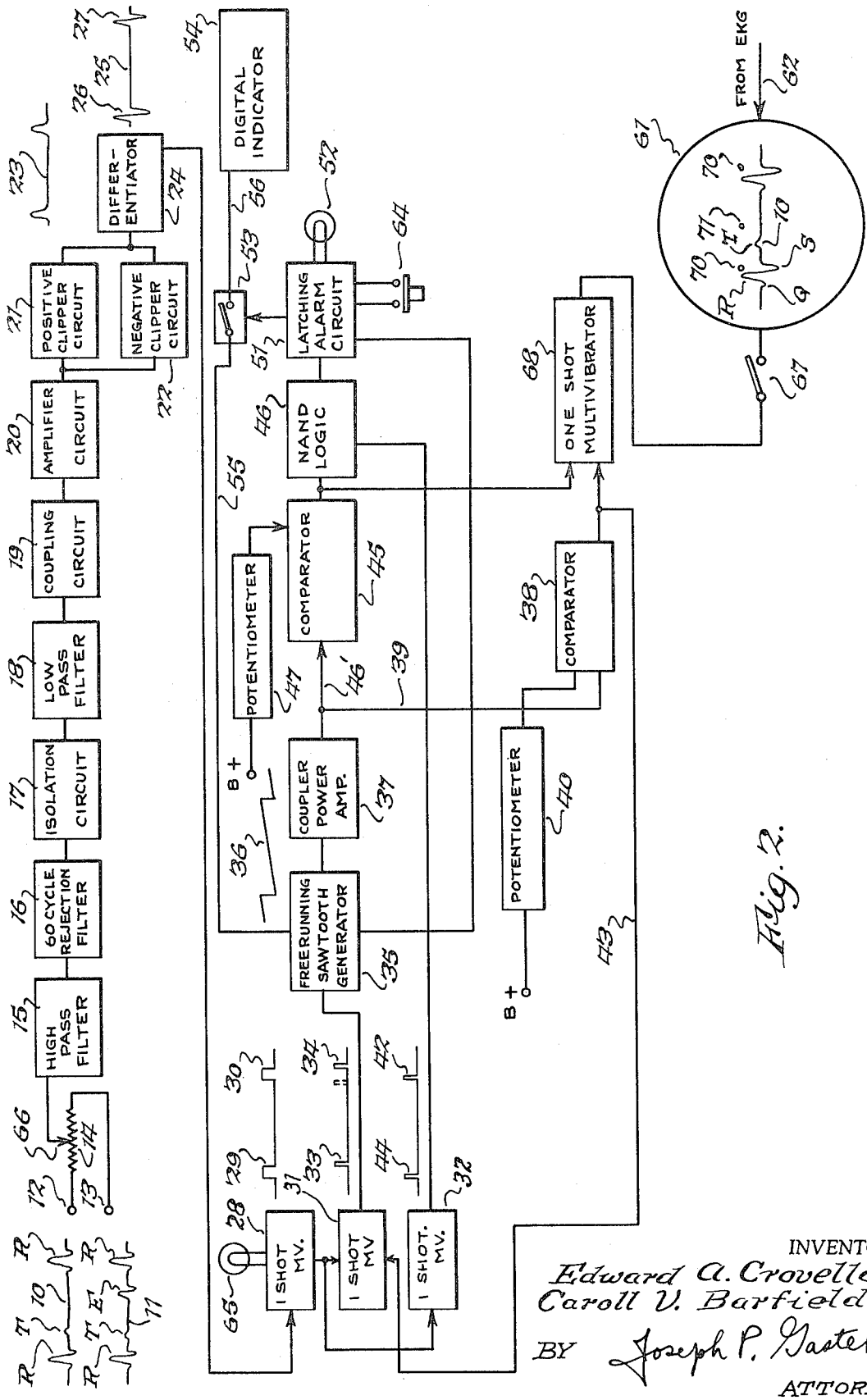
FIG. 2 is a block diagram of the improved critical ectopic beat detector of the present invention.

The normal heartbeat is shown at 10 in FIGS. 2 and 3. This heartbeat, insofar as pertinent here, includes an R-wave and a T-wave, which is subsequently followed by another R-wave. The Q and S portions of the heartbeat are shown in FIG. 3 but will not be referred to hereafter inasmuch as they are not pertinent to the present subject matter. A damaged heartbeat is shown at 11 in FIGS. 2 and 3, and includes a R-wave, a T-wave and an ectopic beat E which is followed by a subsequent R-wave. As noted above the heart may produce normal wave forms 10 for a period of time and occasionally include an ectopic beat E. In essence, heartbeat waveform 11 is normal waveform 10 plus an ectopic beat E. Normally this ectopic beat falls between the T-wave and the subsequent R-wave. As long as it stays a predetermined minimum distance from the T-wave, there usually is not any great danger of fibrillation. However, if the ectopic beat should move from the position E in FIG. 3 to the position E', thereby showing a sliding to the left so as to approach the T-wave, there may be fibrillation in the future and this will usually occur when the ectopic beat is superimposed on the T-wave.

The circuit of the present invention detects ectopic beats and determines whether they are sliding towards superimposition with the T-wave. The circuit includes a pair of electrocardiograph leads 12 and 13 which may be coupled to any type of suitable sensing electrodes, such leads also being coupled to potentiometer 14 which picks up the required voltage. The heartbeat waveforms 10 or 11, as the case may be, are passed from potentiometer 14 to high pass filter 15 which removes base line wandering below one cycle. Thereafter the waveform is fed to the 60-cycle rejection filter 16 which rejects any 60-cycle voltage which appears on the signal, this voltage normally being picked up because of the patient's proximity to 60-cycle wires. The signal is thereafter fed to the normal isolation transistor circuit which isolates the filter 16 from low pass filter 18 to prevent interaction therebetween. The low pass filter 18 cuts out high frequency, above 80 cycles, due to artifacts from the patient's muscle movement. The output from low pass filter 18 is fed to a conventional coupling circuit 19 which in turn transmits the signal to the amplifier circuit 20 which is essentially an operational amplifier which restores the signal level to overcome the previous loss. The output from amplifier circuit 20 is fed to both positive clipper circuit 21 and negative clipper circuit 22 which cut out the noise due to muscle artifacts. This will cause the waveform to look like clipped form 23 of FIG. 2, if positive. The clipped waveform is thereafter fed to differentiator 24 which converts the clipped signals to spikes and this waveform is shown at 25 in FIGS. 2 and 3. It will be assumed that waveform 25 is one which has an ectopic beat therein. Therefore, spikes 26 will be representative of the R-waves of the normal heartbeat and spike 27 will be produced by the ectopic beat E. It is the timed relationship between the spike 26 formed by the R-waves and the spike 27 formed by the ectopic beat which is used to determine whether the ectopic beat is approaching the previous R-wave.

The output from differentiator 24 is fed to one-shot multivibrator 28 which produces a 100 millisecond square wave output 29 or 30 every time that it is triggered by a spike 26 or 27, respectively. The square waves 29 and 30 in turn are used to trigger one-shot multivibrators 31 and 32. Multivibrator 31 is triggered at the tail end of waves 29 and 30 to provide a 2-millisecond reset pulse 33 at the tail end of each R-wave generated square wave 29 and a 2-millisecond pulse 34 at the tail end of the ectopic beat generated square wave 30. The reset pulses 33 are fed to and trigger the free-running sawtooth generator 35 which will produce a sawtooth wave output 36. As can be seen from FIG. 3 sawtooth wave 36 will generally run from the end of one reset pulse 33 to the beginning of the next reset pulse 33 notwithstanding the possible existence of an ectopic beat generated reset pulse 34 therebetween, which does not occur, as explained in greater detail hereafter.

The output of the sawtooth generator 35 is coupled to a coupler power amplifier 37 which in turn is coupled to a comparator circuit 38 through lead 39. The comparator is a conventional circuit known as a 709 Comparator and also has an input thereto from potentiometer 40 which sets the basic voltage which is to be compared to the sawtooth generated voltage 36. Comparator 38 may be of the type shown on page 165 of the 1967 Edition of the *Fairchild Semi-Conductor Linear Integrated Circuits Applications Handbook*. At this point it is extremely important to note that the magnitude of the voltage of sawtooth wave 36 at any given instant is directly proportional to the time from the point at which reset occurred, that is, since sawtooth wave 36 is formed by a straight line with a predetermined slope, in going upwardly from the lowermost reset point 41, the wave 36 will at any instant be a measure of the elapsed time from that point 41. Potentiometer 40 provides waveform P which is a constant DC output, which is a representation of a length of time, that is, it is directly proportional to time, when considered in reference to the amplitude of sawtooth wave 36. Whenever the sawtooth waveform 36 at any instant in time, such as the instant in time corresponding to waveform 42, is less than the value of waveform P, there will be a negative output from comparator 38 which will be fed back to multivibrator 31 through lead 43 and thus prevent reset of the sawtooth generator, by preventing any pulse between reset pulses 33 from being used as a trigger to reset the sawtooth generator. In other words, as can be seen from FIG. 3, the sawtooth wave 36 will be generated by and between adjacent reset pulses 33, that is, whenever the potential of sawtooth wave 36 reaches the value of voltage P the comparator will provide a positive signal to cause the reset pulses 33 to reset the sawtooth generator. Otherwise, reset will not occur.

In accordance with the present invention, a circuit is provided for determining whether the ectopic beat as represented by spike 27 is approaching the T-wave. Since the T-wave is relatively small electronically and is difficult to measure, and since the T-wave bears a predetermined timed relationship to the R-wave as represented by spike 26, the distance or time between the ectopic beat and the T-wave can be measured by the distance of the ectopic beat from the preceding R-wave. To this end, as noted above, spikes 26 and 27 are used to generate square waves 29 and 30, respectively. The leading edges of square waves 29 and 30 are used to generate 2 millisecond sample pulses 44 and 42, respectively. The distance between sample pulse 44 and the subsequent sample pulse 42 is the same as the time between spikes 26 and 27 which is the same as the time between wave R and ectopic beat E. These sample pulses 44 and 42 are utilized to determine whether the ectopic beat is approaching the previous R wave. More specifically, a potentiometer 47 is provided which has its output coupled to comparator 45, which is also coupled to the output of coupler-amplifier 37 through lead 46'. Thus comparator 45 which may be of the 709 type, as described above, compares the voltage of potentiometer 47 with the output of the sawtooth generator 35. The voltage level of potentiometer 47 is shown at M in FIG. 3. Potentiometer 47 is set at any determined level, as explained in detail hereafter, and the magnitude of the voltage is a measure of time because voltage P is a measure of time, and the magnitude of sawtooth wave 36 is a measure of time. The comparator 45 will provide a positive output only if the value of the sawtooth wave 36 is less than the value of the voltage M. Otherwise there is a negative output. The output of sample multivibrator 32 is coupled to AND logic computer 46 by lead 48, along with the output of comparator 45. AND logic 46 may be of the type shown in the paragraph entitled " Gating Circuits" on page 83 of the *RCA Transistor Manual*, Technical Series SC-13, Edition of 8-67, Copyrighted 1967. If the magnitude of sawtooth wave 36 at the time of sampling is greater than the potential of the M voltage, as would be the case at time 49, there would be a negative output from the comparator 45. If at the time a sample pulse 42 or 44 is applied to the AND logic 46, this negative output is applied by comparator 45 to AND 46, there will be no output from the AND, because the NAND will only provide an output if the sample pulse and the comparator 45 output are both positive. Time 49 is when sample pulse 42 occurs a sufficiently long time after sample pulse 44, that is, when the ectopic beat is sufficiently long after the previous R-wave and therefore sufficiently far removed from the previous T-wave. However, if for any reason the ectopic beat E should start shifting to the left so that it would assume the location at E' and thus generate a spike 27' which in turn would generate a square wave 30' and in turn produce a sample pulse 42' at time 50, at this point the M voltage would be greater than the voltage of the sawtooth generated voltage 36, and thus indicate that a shorter time has elapsed from the previous R-wave than elapsed to the time 49. This being the case, the AND logic circuit would be energized because the output from the comparator was positive at the same time that positive pulse 42 occurred. The AND 46 will therefore energize the latching alarm circuit 51 coupled thereto which in turn would ignite the alarm lamp 52 and also close latching circuit 53 coupling the sawtooth generator 35 to digital indicator 54 via leads 55 and 56. This will cause a voltage to be applied to the digital indicator, and the magnitude of this voltage will be caused to remain constant because of the connection between the latching alarm circuit 51 and the sawtooth generator 35 through lead 57. As noted above, the magnitude of the sawtooth wave at any given instant is a measure of time from the last R-wave at which it was reset. Therefore when the voltage is stopped by the latching alarm circuit, it is this voltage of the sawtooth generator which is applied to the digital indicator 54 to provide a read-out at 58 which shows the number of milliseconds which transpired between the previous R-wave and the subsequent ectopic beat E'. It will be appreciated that when sample pulses 44 are applied to AND 46, the magnitude of the sawtooth voltage 36 must be greater than voltage M to cause the comparator to provide a negative output and therefore AND 46 will not be actuated at this time because, as noted above, a positive pulse from comparator 45 must be sensed by AND 46 at the same that a positive pulse is provided by multivibrator 32. Thus, sample pulses 44, generated by the R-waves cannot actuate the alarm circuit because, at this time, comparator 45 produces a negative output.

Figure 1:
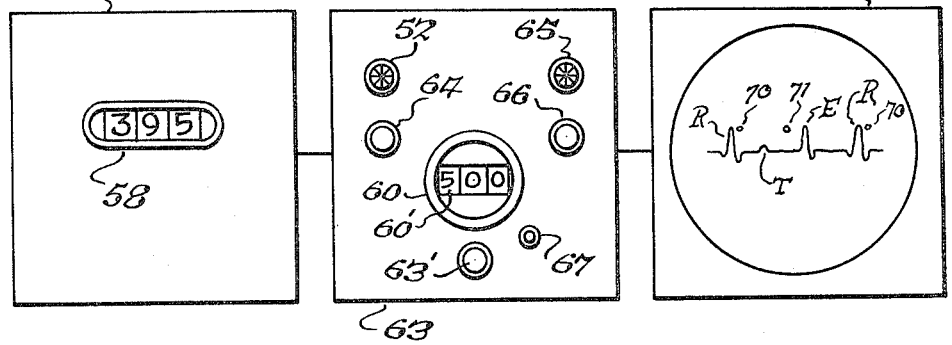
FIG. 1 is a front elevational view of the faces of the various instruments which comprise the device of the present invention.

The faces of the various units containing the circuits of FIG. 2, are shown in FIG. 1. As can be seen, the digital indicator 54 is shown which has a digital read-out window 58. This digital read-out is obtained when latching switch 53 is closed and it will show the time which has elapsed between a previous R-wave and a subsequent ectopic beat as explained in detail above. If desired, a digital print-out device, which is conventional in the art, may be substituted for digital indicator 54 so as to provide a written record.

The device also includes a computer unit 63 which contains all of the circuit components except the digital indicator 54 and the oscilloscope 61 which receives its input from the electrocardiograph lead 62. The face of the computer unit 63 includes the alarm lamp 52, noted above, which ignites when the ectopic beat occurs within a predetermined time after the previous R-wave. In order to set the minimum desired time between a previous R-wave and the ectopic interval, a knob 60 is provided surrounding a movable counter 60'. Knob 60 is manipulated to place in the window the minimum desired time between an R-wave and a subsequent ectopic beat and this causes a corresponding voltage to be provided by potentiometer 47 which in turn provides the voltage M described in detail above.

At this point it is to be noted that the computer also includes a reset button 64 which is utilized to reset the latching alarm circuit 51 after it has been energized. A R-wave lamp 65 is also provided which ignites with every R-wave. This lamp is shown in FIG. 2 and it is coupled to multivibrator 28 and is ignited whenever this multivibrator is energized. This provides a visual indication every time there is a heart beat or ectopic beat. Thus by observing this light, if there is no ectopic beat, there will be an equal time interval between adjacent R-waves. On the other hand, if there is an ectopic beat, there will be an occasional irregularity in the interval between the times that the R-wave light lights up and this will serve to provide an indication of the ectopic beat.

The computer unit also includes a sensitivity control 66 which is essentially the voltage take-off associated with potentiometer 14 (FIG. 2). This provides the optimum selectivity between the electrocardiograph signal and the inherent muscle noise and thus discriminates against electrical noise. The computer also includes a knob 63' which is associated with potentiometer 40 to set it at the normal R-wave interval. This is accomplished by closing marker switch 67 which couples one shot multivibrator 68 to cathode ray oscilloscope 61 on which the heartbeat waveform 10 is displayed. It can readily be seen that when switch 67 is closed, the one shot multivibrator will energize the deflection circuits of oscilloscope 61. Multivibrator 68 in turn is energized every time there is a positive output from comparator 45 and comparator 38. As noted above, comparator 45 will be energized to provide a positive output as soon as the sawtooth voltage is less than the voltage produced by potentiometer 47. This occurs approximately at time 50. Thus, a square wave will tend to be generated on the oscilloscope 61 at this time. This square wave is of twenty millisecond duration, and its magnitude is approximately the magnitude of the R-wave. However, since the magnitude is reached almost instantaneously with the triggering of the multivibrator, the vertical traces of the square wave will not appear on the scope. However, since the square wave is of twenty milliseconds duration, there will be a horizontal sweep produced by the multivibrator for this period at the magnitude of the R-wave and this will appear as a very short line or dot 71 on the scope. Therefore, multivibrator 68 will provide a dot on the scope whenever comparator 45 is energized at time 50. This dot will appear somewhere between adjacent R-waves. If the actual ectopic beat E is to the right of dot 70, it is in the safe zone; if it is to the left, it shows that it has approached the T-wave, away from the safe zone. However, in order to set the R-waves relative to each other so that the dot 70 will be synchronized time-wise relative to the R-waves, knob 63' is used which sets the value of potentiometer 40. This will cause a dot 70 to appear on the scope every time the sawtooth voltage triggers the comparator 38, and this will occur only when the magnitude of the sawtooth is approximately the same magnitude as the voltage P to cause comparator 38 to provide a positive output. This can be seen from FIG. 3 from which it will be seen that reset of the sawtooth wave 36 will occur when the sawtooth wave is of a magnitude of voltage P. Therefore, the higher the voltage P, the longer will be the length of the sawtooth, and the lower the voltage P, the shorter the length of the sawtooth, and thus the voltage P is a measure of the time between subsequent R-waves. The dots 70 and 71 give a visual indication on the scope of the relative positions between adjacent R-waves and the minimum desired time between an ectopic beat and the preceding R-wave. In actual use, when dots 70 and 71 are caused to appear on the scope, an attendant can observe whether the ectopic beat, as seen on the heartbeat waveform on the scope, is approaching the dot 71 and this can provide the attendant with a visual indication of such an approach before the alarm circuit described above is actuated.

Quantitatively, the general time between adjacent R-waves is between 800 and 1,000 milliseconds for most patients. The T-wave will normally occur between 200 and 500 milliseconds after the preceding R-wave. Generally if there is an ectopic beat, it will fall at approximately 650 milliseconds after the preceding R-wave and these ectopic beats will remain at this time interval. However, if it is seen on the oscilloscope that the ectopic beats start approaching the R-waves so as to approach the 200 to 500 millisecond range in which the T-wave falls, medication can be given to desensitize the patient. The dial 60' is usually set at about 500 milliseconds to provide an alarm in the event the ectopic beat starts approaching the T-wave.

We claim:

1. A critical ectopic beat detector for providing a warning that an ectopic beat is approaching a critical portion of a heartbeat comprising first circuit means for monitoring a heartbeat including means for detecting a predetermined normal portion of a heartbeat and for detecting an ectopic beat, second circuit means for measuring the time relationship between said normal portion of said heartbeat and said ectopic beat, and third circuit means for providing an indication of when said ectopic beat bears a predetermined timed relationship to said normal portion of said heartbeat, said third circuit means including means for providing an alarm signal when said predetermined timed relationship is experienced, said heartbeat including a R-wave and wherein said first circuit means comprises first means for providing a first impulse each time that it is triggered by a R-wave and a second impulse when triggered by said ectopic beat, second means triggered by said first means to provide a reset pulse every time said first means is triggered by said R-wave, a free-running sawtooth generator coupled to said second means and triggered by said reset pulses to periodically reset said sawtooth generator whereby the magnitude of said sawtooth voltage at any particular time is a measure of elapsed time from each reset pulse and therefore from said R-wave, comparator means coupled to said sawtooth generator, potentiometer means coupled to said comparator to provide a voltage which is a measure of minimum desired elapsed time between said R-wave and a subsequent ectopic beat, said comparator comparing said sawtooth voltage with the output of said potentiometer means at the time of said ectopic beat to provide a first type of output when said potentiometer voltage is in excess of said sawtooth voltage and a second type of output when said potentiometer voltage is less than said sawtooth voltage, fourth circuit means coupling said comparator to said third circuit means for providing said third signal whenever said first type of output is obtained signifying that the elapsed time between said R-wave and said subsequent ectopic beat is less than said predetermined minimum, said first means comprising a first multivibrator for providing a first square wave of relatively long duration and said second means comprising a second multivibrator providing a second square wave of relatively short duration at a first predetermined portion of each of said first square waves, means for preventing said second square waves produced at the time of said ectopic beat from resetting said sawtooth generator, third means comprising a third multivibrator for providing a third square wave of relatively short duration at a second predetermined portion of said first square wave for acting as a sample pulse, a second comparator coupled to said sawtooth generator, second potentiometer means coupled to said second comparator for providing a voltage which is proportional to the time between adjacent R-waves, and said third circuit means including a logic circuit coupled to said third multivibrator and periodically energized by said sample pulses.

* * * * *